Dec. 17, 1968    G. B. L. HENNEBUTTE    3,416,171
SURF-BOAT WITH AIR-FLOATS
Filed Sept. 12, 1967    7 Sheets-Sheet 1

INVENTOR
GEORGES BERTRAND LEON HENNEBUTTE

By M Glew and Toren
ATTORNEYS

Dec. 17, 1968  G. B. L. HENNEBUTTE  3,416,171
SURF-BOAT WITH AIR-FLOATS
Filed Sept. 12, 1967  7 Sheets-Sheet 3

INVENTOR
GEORGES BERTRAND LEON HENNEBUTTE
BY McGlew and Toren
ATTORNEYS

Dec. 17, 1968  G. B. L. HENNEBUTTE  3,416,171
SURF-BOAT WITH AIR-FLOATS
Filed Sept. 12, 1967  7 Sheets-Sheet 4

INVENTOR
GEORGES BERTRAND LEON HENNEBUTTE
By M<sup>c</sup>Glew and Toren
ATTORNEYS INVENTOR
GEORGES BERTRAND LEON HENNEBUTTE
By: McGlew and Toren
ATTORNEYS Dec. 17, 1968   G. B. L. HENNEBUTTE   3,416,171
SURF-BOAT WITH AIR-FLOATS
Filed Sept. 12, 1967   7 Sheets-Sheet 6

INVENTOR
GEORGES BERTRAND LEON HENNEBUTTE
By: McGlew and Toren
ATTORNEYS

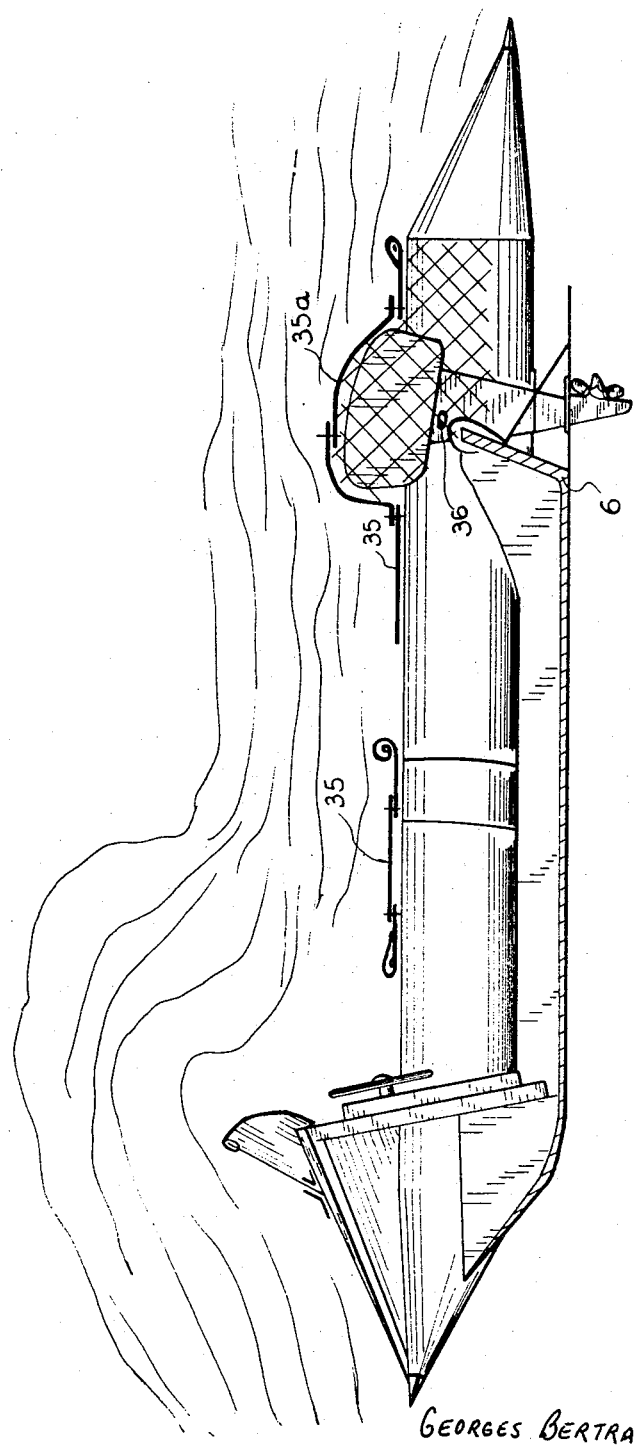

United States Patent Office 3,416,171
Patented Dec. 17, 1968

3,416,171
SURF-BOAT WITH AIR-FLOATS
Georges Bertrand Léon Hennebutte, 4 Rue du Jardin
Public, Biarritz, Basses-Pyrenees, France
Filed Sept. 12, 1967, Ser. No. 667,207
Claims priority, application France, Sept. 19, 1966,
76,890
8 Claims. (Cl. 9—2)

ABSTRACT OF THE DISCLOSURE

A surf-boat comprising a rigid hull with concave sides and elongated air-floats fixed along the sides, blocks which each have a profiled underface fixed on the top of each float and a hollowed-out top face forming a recess, at least one surf-board being placed flatwise within said recess and a detachable elastic tie which serves to hold said surf-board in position.

---

This invention relates to a surf-boat having a plastic hull with concave sides in which elongated air-floats can be fitted in order to perform the function of lateral stabilizers. Boats of this type are usually equipped with an outboard motor and profiled so as to lift off the water at high speeds.

The aim of the invention is to provide a boat of this type which is specially designed to travel across breaking waves and thus to transport surf-riders together with their equipment, and especially surf-boards, to the seaward side of the breaker zone.

As a consequence, and according to a first feature of the invention. each of said lateral stabilizers comprises a cylindrical portion of substantial length along the edges of which are attached two profiled blocks, said blocks being provided at the top with recesses for accommodating a surf-board which is placed flatwise on the two blocks and held in position by means of a detachable elastic tie.

According to another feature of the invention, an elongated air-cylinder of substantial diameter which is mounted on blocks secured to the flooring of the boat and which is held in position by means of elastic ties performs the function of a shock-damping seat for the team members.

Additional features of the invention are intended to facilitate the penetration of the boat through the breakers while improving its performance and manoeuvrability.

The different features mentioned above as well as the advantages of the invention will become readily apparent from the following description, reference being had to the accompanying drawings, in which:

FIGS. 9 and 10 show respectively in perspective, in top view and in profile the fabric cover which provides protection when the boat is in operation.

The surf-boat which is illustrated in the accompaying drawings has a pyramidal shape at the forward end in order to penetrate into the breaker more effectively and comprises lateral air stabilizers 1 and 2. Said stabilizers are adapted to absorb the shock wave which is produced by the breaking of the steep waves and right the boat in the event of listing or pitching. When the boat is sailing in a straight line at normal speed, said stabilizers do not rest on the water. The stabilizers are firmly bonded to the side walls of a rigid hull which is formed of a molded plastic material such as a laminate and which serves as a frame. The rigid bottom 5 of said hull has a profile in the shape of a very wide-angle V and is clinker-built.

Figure 3:
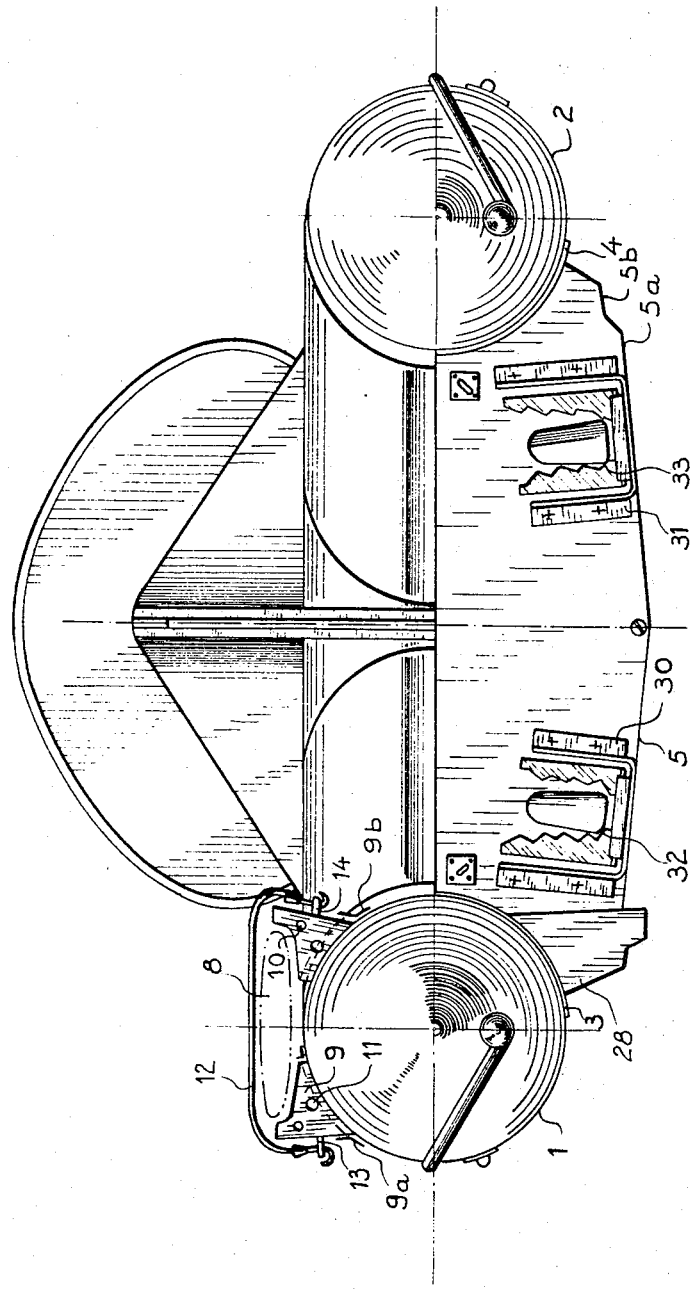
FIG. 3 is a fragmentary sectional view looking on the rear.

From FIG. 3, it is apparent that, by virtue of its clinker-built design, the bottom 5 is capable of bearing on the water either solely by means of the surface 5a (which is the case at high speeds) or, in addition, by means of the surface 5b (which is the case at lower speeds) or additionally by means of the rear ends of the pneumatic stabilizers. There is thus obtained a particularly satisfactory lift of the boat as a function of the speed.

Figure 4:
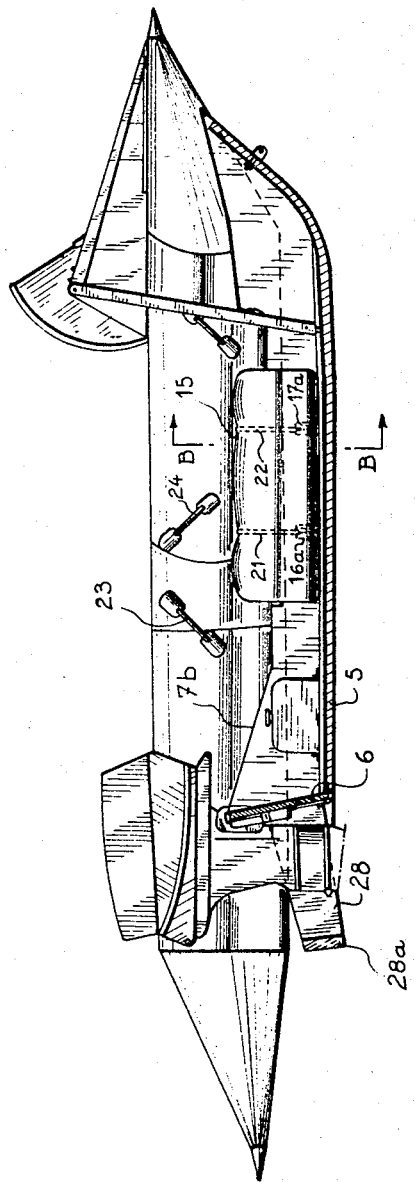
FIG. 4 is a sectional view taken along line A—A of FIG. 2.
Figure 2:
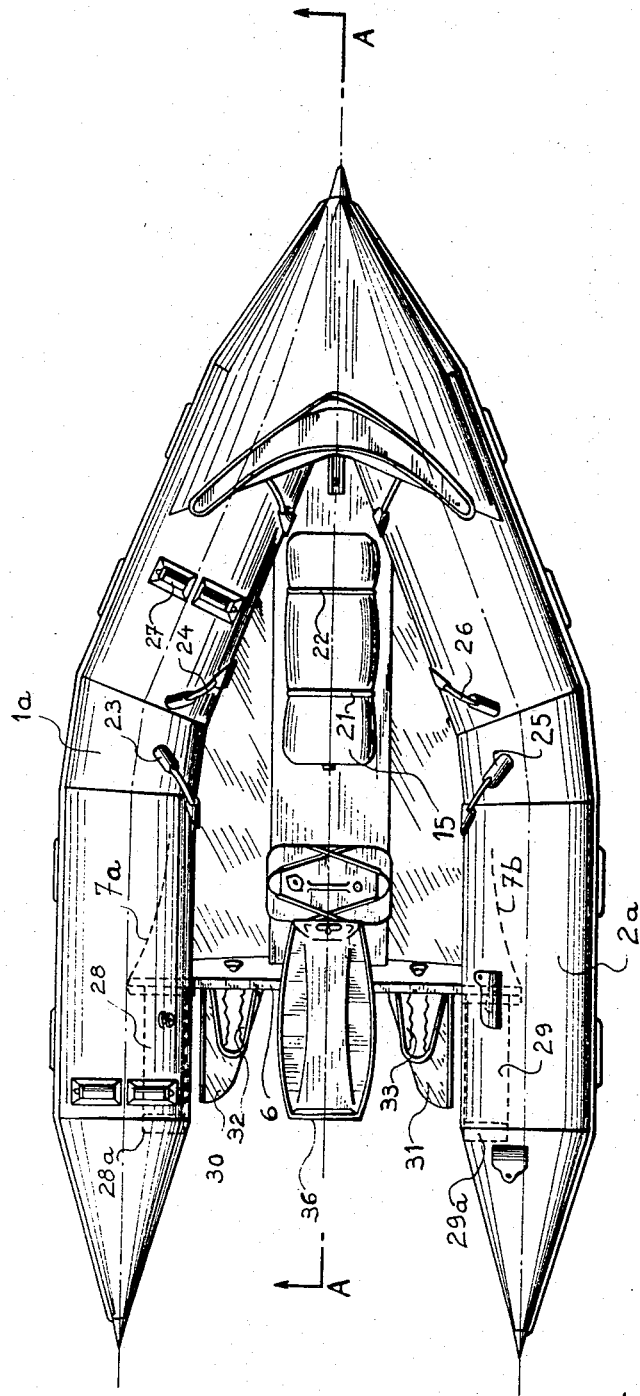
FIG. 2 is a plan view of said surf-boat.

According to another feature of the invention, the tail-board 6 is attached to the bottom by means of strengthening flanges 7a, 7b which are of concave shape (FIGS. 2 and 4).

Figure 6:
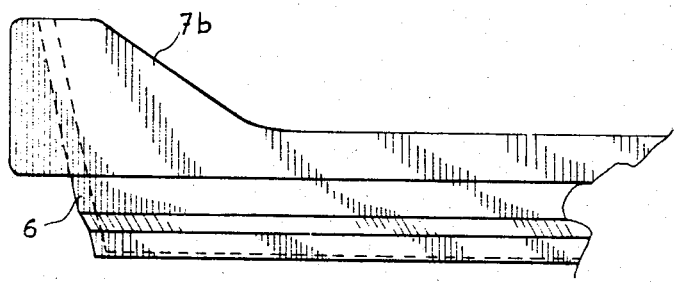
FIG. 6 is a diagrammatic profile view of a portion of the hull fitted with strengthening flanges having a shape which is slightly different from that of the flanges shown in FIGS. 2 and 4.
Figure 7:
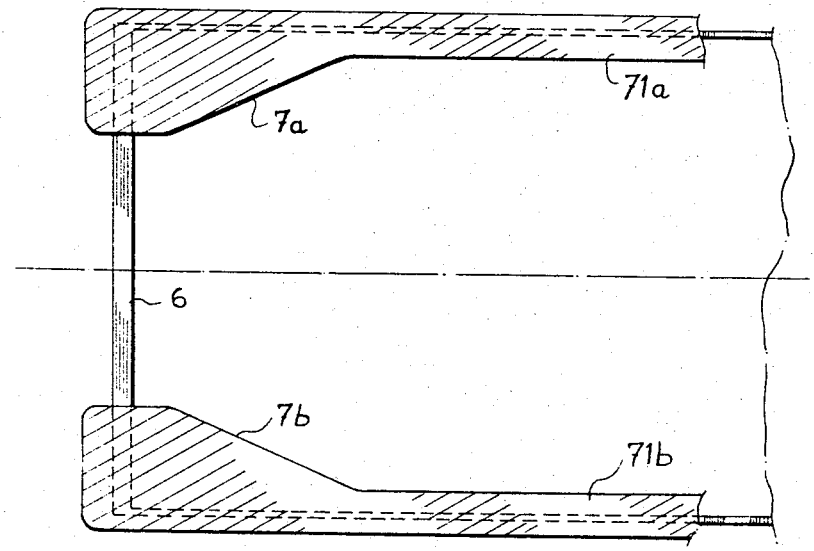
FIG. 7 is a diagrammatic plan view corresponding to FIG. 6.

The above-mentioned flanges are more clearly shown in a slightly different form of construction in FIGS. 6 and 7, from which it is apparent that said flanges have terminal portions in the form of channel sections at 71a, 71b.

The stabilizers are bonded to and in closely fitting relation with the concave portions of the freeboard (3 and 4, FIG. 3) and strengthening flanges (7a, 7b), thereby preventing execessive deformation of said stabilizers at the time of penetration of the boat through the waves. The fractures which frequently occur at such times in boats of this type are thus prevented.

The essential object of the surf-boat according to the invention is to transport surf-riding teams together with their surf-boards across breaker zones.

In accordance with an important feature of the invention, said surf-boards are placed flat on the lateral stabilizers. the parallel cylindrical portions of which (as designated by the references 1a, 2a in FIG. 2) have a sufficient length for this purpose.

As shown in FIG. 3, each surf-board 8 is clamped in position by means of two flexible blocks 9–10 comprising bores such as the bore 11 for the outflow of water. Said blocks are secured or bonded to the top surface of the stabilizer and are in closely fitting relation therewith. Strips of fabric such as the strips 9a, 9b are glued to the floats and to the blocks to provide a reinforced joint.

An elastic tie 12 whose ends are detachably engaged in rings 13 and 14 fitted respectively on the blocks 9 and 10 makes it possible to apply each surf-board within the recessed portions of the blocks in order to prevent the surf-boards from being dislodged during the passage through the waves.

It will be understood that, although only a single surf-board together with its fastening system is shown in FIG. 3, a second surf-board can naturally be placed on the second stabilizer.

In this type of craft, it is obviously very important to ensure safety of the team members.

Figure 5:
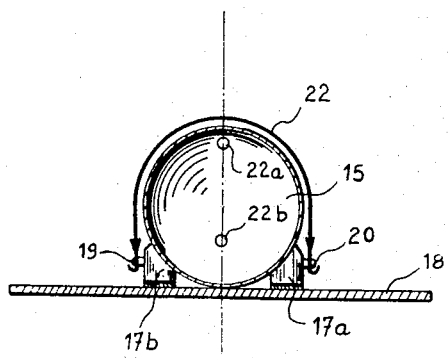
FIG. 5 is a sectional view taken along line B—B of FIG. 4.

With this object in mind, an air cylinder 15 of substantial diameter which is inflated to a low pressure is mounted on flexible blocks 16a–16b, 17a–17b (as shown in FIGS. 4 and 5) which are secured to the flooring element 18 of the boat. The blocks referred-to are fitted with rings such as the rings 19–20 in which are engaged the ends of the elastic ties 21–22. Said ties serve to retain the cylinder 15 and deform this latter at the points at which it is secured. A number of team members may thus sit astride said cylinder while holding onto hand rails or handles of the type designated by the reference numerals 23 to 26, as shown in FIG. 2. In addition, the riders' thighs are held by means of quick-release straps.

As an advantageous feature, the cylinder 15 is additionally provided with a first orifice 22a (FIG. 5) fitted with a plug for inflation purposes and located at the top portion of the cylinder and a second orifice 22b located at the bottom portion of the cylinder. The function of said second orifice is to permit the introduction of ballast material therein, thereby contributing to the stability of the craft as a whole.

Figure 1:
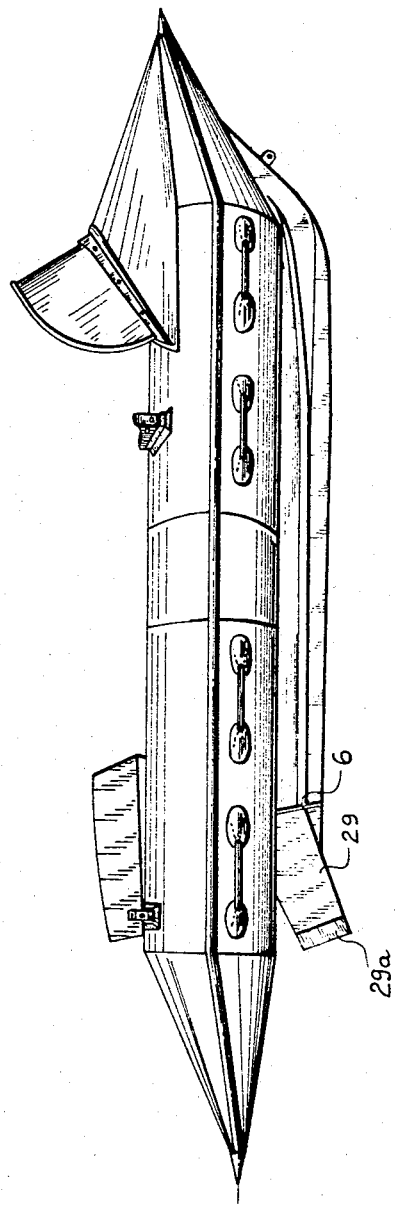
FIG. 1 is a view in elevation of a surf-boat in accordance with a preferred form of execution of the invention.

Two blocks 28–29 are applied respectively on the port and starboard side against the tail-board 6, as shown in FIG. 2 (in FIG. 3, only one block is shown in order that the profile of the bottom of the hull should be more completely visible). Said blocks each have a terminal portion (28a, 29a in FIGS. 1, 2 and 4) which is formed of rubber and the rear face of which (as shown in FIG. 1) is slightly sloping. Thus, once the stabilizers are deflated and packed into the concave portions of the hull by folding back around the surface of the tail-board 6, the boat can be set upright against a vertical wall but in a slightly inclined position with the rear faces of the blocks resting on the ground. By means of this arrangement, the surf-boats may be stored upright in their boat-house.

In the mode of execution which is illustrated in FIGS. 1 to 4, it can be seen that the blocks 28 and 29 are secured to the tail-board externally of two foot-plates 30 and 31 which serve to facilitate boarding of the craft by passengers. Provision is made above said foot-plates for bellows-type scuppers 32 and 33 of a type known per se for the purpose of discharging any sea water which may have penetrated into the craft under the action of the waves.

Figure 8:
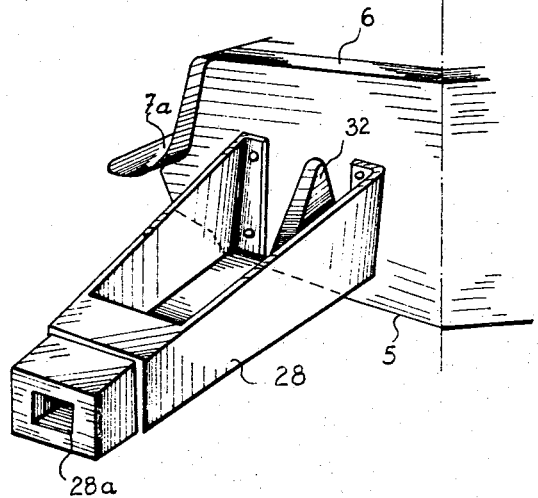
FIG. 8 shows an alternative form of execution of the support blocks which are intended to facilitate storage of the boat in the upright position.

In the alternative form which is illustrated diagrammatically in FIG. 8, the orifice of a scupper (the bellows element of which is not shown in this figure) appears at 32; the boarding foot-plate has been replaced by a block of suitable shape which thus performs the double function of a foot-board and of a support for storage purposes. The rubber portion 28a of the block is clearly visible in FIG. 8 as well as the shape of the strengthening flange 7a.

A further characteristic feature of the invention lies in the design of the fabric cover 35 which serves to protect the boat: instead of terminating in front of the motor 36 as is usually the case, said cover is extended to the rear end of the cylindrical portions of the air stabilizers, thus forming a bag 35a which covers the motor casing. This loose bag forms around the motor a chamber which has a sufficient volume to permit the pivotal movement of the motor when changing course. When the boat is submerged in a mass of water as shown in FIG. 10, an air pocket remains trapped under the cover behind the tail-board 6 and maintains the supply of air to the motor intake 36, with the result that the acceleration of the motor is maintained at the moment when the boat is passing through a wave and sea water is not permitted to pass into the air intake.

Figure 9:
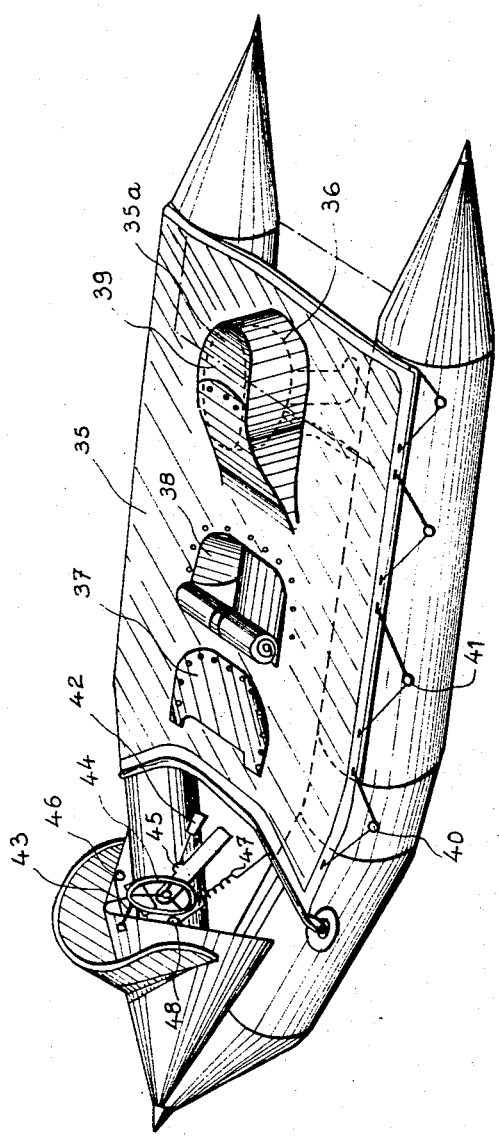

As is apparent, the fabric cover 35 comprises sealing flaps such as the flaps 37, 38 which enable passengers to be seated in the craft even when the fabric cover is laid over the boat (in FIG. 9, the flap 37 is shown in the closed position whilst the flap 38 is shown in the open position).

The sealing flap 39 makes it possible in addition to gain access to the motor for the purpose of starting by means of the ignition control lever which is usually provided for this purpose.

The cleats which serve to fasten the fabric cover to the lateral stabilizers are designated by the reference numerals 40, 41 in FIG. 9.

In accordance with another feature of the invention, an accelerator foot-pedal 42 (FIG. 9) serves to operate the usual acceleration control lever 43 which is mounted on the dashboard beside the steering wheel 44. This operation is carried out by means of pulleys 45–46 and provides the driver with greater freedom of movement of the arms, which is very important when passing through a breaker.

A return spring 47, one end 48 of which is attached to the hull is adapted to restore the acceleration control lever 43 to the slow-running position by means of a pulley 48 as soon as the driver releases the accelerator pedal.

As is readily apparent, a number of modifications can be made in the surf-boat as described and illustrated without thereby departing either from the scope or the spirit of the invention. For example, the channel sections 71a and 71b need not be placed astride the freeboard but could form an extension of this latter, preferably towards the exterior, in order to construct a hull which is molded in draw taper.

What is claimed is:

1. A surf-boat of the type comprising a rigid hull with concave sides and elongated air-floats which are fixed along said sides, wherein provision is made for blocks which each have a profiled underface fixed on the top face of each float and a hollowed-out top face forming a recess, at least one surf-board placed flatwise within said recess and a detachable elastic tie which serves to hold said surf-board in position.

2. A surf-boat as claimed in claim 1, wherein said hull has a flooring member and blocks secured to said flooring member at the forward end of the boat, an inflatable elongated air-cylinder being mounted on said blocks, provision being made for elastic ties which serve to hold said cylinder in position.

3. A surf-boat as claimed in claim 2, wherein said air-cylinder is provided on its underside with an opening for the purpose of loading said boat with ballast.

4. A surf-boat as claimed in claim 1, wherein the hull comprises a tail-board, a clinker-built V-section bottom and strengthening flanges of concave shape which serve to couple said tail-board to said bottom.

5. A surf-boat as claimed in claim 1, wherein the hull comprises a tail-board, blocks being secured to said tail-board and substantially at right angles thereto, the air-floats being adapted to fold back along the sides of the hull in the deflated condition in such a manner that only said blocks project rearwardly from said tail-board.

6. A surf-boat as claimed in claim 1 wherein the hull is provided with strengthening flanges of concave configuration which form an extension of the free-board of said hull, the sides of said hull being so arranged that the complete hull can be molded in draw taper.

7. A surf-boat as claimed in claim 1 and comprising a tail-board and an outboard motor secured to said tail-board, wherein provision is made for a fabric cover which is laid over the entire boat and covers the motor so as to form an air pocket around said motor.

8. A surf-boat as claimed in claim 1, comprising a tail-board and an outboard motor secured to said tail-board, a dashboard at the forward end fitted with a steering wheel and a motor-acceleration control lever, wherein provision is made for an accelerator pedal and for means whereby said acceleration control lever is operated from said accelerator pedal.

(References on following page)

References Cited

UNITED STATES PATENTS

| | | | |
|---|---|---|---|
| 2,205,050 | 6/1940 | Sato | 9—1 |
| 2,698,447 | 1/1955 | Potts et al. | 9—2 |
| 2,949,616 | 8/1960 | Desanges | 9—2 |
| 3,261,038 | 7/1966 | Klepper | 9—2 |

FOREIGN PATENTS

| | | |
|---|---|---|
| 825,361 | 12/1951 | Germany. |
| 983,819 | 2/1965 | Great Britain. |
| 259,604 | 6/1965 | Australia. |

OTHER REFERENCES

Popular Mechanics, May 1964, vol. 121, No. 5, p. 112.

MILTON BUCHLER, *Primary Examiner.*

R. A. DORNON, *Assistant Examiner.*

U.S. Cl. X.R.

9—310; 114—43.5; 115—18